United States Patent
Schürmann et al.

(10) Patent No.: US 6,215,437 B1
(45) Date of Patent: Apr. 10, 2001

(54) PROCEDURE FOR READING THE DATA STORED IN A TRANSPONDER AND A TRANSPONDER SYSTEM FOR THE EXECUTION OF THE PROCEDURE

(75) Inventors: Josef H. Schürmann, Oberhummel; Konstantin O. Aslanidis; Andreas Hagl, both of Dachau, all of (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/382,520

(22) Filed: Aug. 25, 1999

(30) Foreign Application Priority Data

Oct. 13, 1998 (DE) .............................................. 198 47 135

(51) Int. Cl.[7] .................................................. G01S 13/76
(52) U.S. Cl. ................................ 342/42; 342/44; 342/51
(58) Field of Search .................................. 342/42, 44, 51, 342/159, 162

(56) References Cited

U.S. PATENT DOCUMENTS

| | | | | |
|---|---|---|---|---|
| 3,605,029 | * | 9/1971 | Freedman | 327/345 |
| 3,617,998 | * | 11/1971 | Freedman | 367/136 |
| 4,121,102 | * | 10/1978 | Wilson | 250/341.1 |
| 5,134,720 | * | 7/1992 | Gamgee et al. | 455/164.1 |
| 5,293,399 | * | 3/1994 | Hefti | 340/10.34 |

* cited by examiner

*Primary Examiner*—John B. Sotomayor
(74) *Attorney, Agent, or Firm*—Wade James Brady, III; Frederick J. Telecky, Jr.

(57) ABSTRACT

For reading the data stored in a transponder by means of an interrogation device, the interrogation device at first receives the background noise for the purpose of detecting interference frequencies present in this background noise. On the basis of the interference frequencies acquired, coefficients for an adaptive filter are computed by means of which this filter may be tuned in such a way as to suppress the interference frequencies. The response signal from the transponder with the superimposed background noise is received by the interrogation device and routed through the adaptive filter which acts to suppress the interference frequencies. The signal available at the output of the filter can then be demodulated for the purpose of reading the data stored. The transponder system for the execution of the procedure comprises a digital signal processor which computes coefficients for an adaptive filter on the basis of the interference frequencies acquired, and tunes the filter in such a way that the interference frequencies within the RF response signal received from the transponder, carrying the superimposed background noise, are suppressed. The output signal from the adaptive filter may then be used for further processing.

7 Claims, 3 Drawing Sheets

PROCEDURE FOR READING THE DATA STORED IN A TRANSPONDER AND A TRANSPONDER SYSTEM FOR THE EXECUTION OF THE PROCEDURE

BACKGROUND AND BRIEF DESCRIPTION OF THE PRIOR ART

The invention relates to a procedure for reading the data stored in a transponder which derives its supply energy from an RF interrogation pulse sent to it by an interrogation device and which transmits the data stored in it as an RF response signal modulated by these data. It furthermore relates to a transponder system for the execution of this procedure.

A transponder system is known from the EP 0 681 192 A2 which consists of two units, namely a transponder and an interrogation device. Data are stored in the transponder which may be read by means of the interrogation device. These data may, for example, serve to identify an object within which or to which the transponder is attached. The transmission of the data is in the form of RF signals, which means that reading the data and therefore, to give an example, the identification of the object to which the transponder is attached does not involve any physical contact.

The transponder of the known transponder system is a batteryless transponder which derives its supply energy from an RF interrogation pulse which is sent by the interrogation device. This RF interrogation pulse is rectified in the transponder and used to charge an energy store which in turn provides the supply energy required by the transponder in order to transmit the data stored in it in the form of RF response signals.

Due to this particularity it is obvious that the transmitting power of the transponder is rather low, which means that the range within which the data can still be read correctly by the interrogation device is limited. The greater the distance between the transponder and the interrogation device, the more feeble is the signal received by the retrieval device, so that, of necessity, interference frequencies receivable within the operating area of the transponder system tend to swamp the RF interrogation signal or at least components of this signal and, therefore, make a correct demodulation of the RF interrogation signal impossible.

SUMMARY OF THE INVENTION

It is the object of the invention to provide a procedure and a transponder system of the type previously indicated which, even in the presence of interference frequencies within the operating frequency range and also where the distance between the transponder and the retrieval device is relatively great, still enables the RF interrogation signals to be correctly demodulated.

According to the invention, this requirement is satisfied in that in the interrogation device,
a) within a time period during which it has not caused the transponder by sending an RF interrogation signal to transmit the RF response signal, the background noise within the frequency range reserved for the signal transmission between the transponder and the interrogation device is received, and the background noise received is converted into a digital signal,
b) interference frequencies within the digital signal are acquired with which a signal with an amplitude exceeding a pre-determined threshold is received,
c) coefficients for an adaptive filter are computed on the basis of the interference frequencies that enable the passband characteristic of the filter to be adapted so as to suppress the interference frequencies acquired,
d) after the transmission of the RF interrogation pulse, an aggregate signal containing the RF response signal transmitted by the transponder and the superimposed background noise is received and converted into a digital signal,
e) the RF signal received is passed through the adaptive filter, tuned by means of the computed coefficients and
f) the filtered output signal from the adaptive filter is demodulated for the purpose of reading the data stored.

By means of the procedure according to the invention, firstly, the necessary preconditions are created so that any interference frequencies in the RF signal received by the retrieval device within the application frequency range are suppressed, so that subsequently an RF signal, freed from these interference frequencies, becomes available for demodulation to extract the data contained in it.

The transponder system according to the invention is characterised in that the interrogation device comprises the following:
I. An A/D converter which converts all analogue signals received by the interrogation device into digital signals,
II. an adaptive filter the passband characteristic of which is adjustable by means of filter coefficients,
III. a digital signal processor (DSP) which controls the procedural sequence and computes and sets the coefficients of the adaptive filter for the suppression of the interference frequencies contained in the background noise, and
IV. a demodulator which demodulates the signals filtered by the adaptive filter for the purpose of extracting the data transmitted by them.

Further advantageous developments of the invention are specified in the sub-claims.

BRIEF DESCRIPTION OF THE DRAWINGS

The invention is now explained in more detail by means of an example with reference to the drawings, where.

DESCRIPTION OF THE PREFERRED EMBODIMENT

Before going into detail about the procedure to be described here, explanation will be made as to how the data transmission between an interrogation device and a batteryless transponder is realised. In the simplest case, a batteryless transponder may just store an identification code, such as a number consisting of several digits, which permits the definite identification of the transponder. This also makes it possible to make an unambiguous identification of objects to which the transponder is firmly attached. It is the purpose of the interrogation device to read this identification number stored in the transponder. Since the transponder does not contain its own energy source, the interrogation device firstly sends an RF interrogation pulse to initiate the reading process, which is used by the transponder to generate the supply energy required for the transmission of the identification number. This is normally realised in such a way that the RF interrogation pulse is rectified in the transponder and then used to charge a capacitor. In the case of a full-duplex system, it is also possible to maintain the capacitor continuously charged by the continuous transmission of a carrier signal. The charge voltage of the capacitor is then used as the supply voltage for the transponder.

Figure 1A:
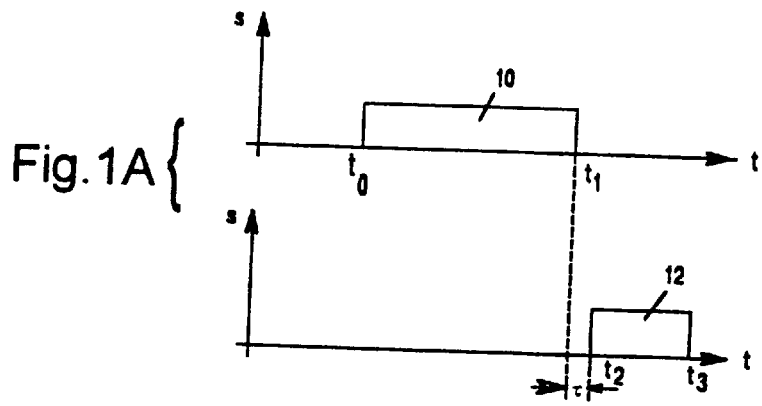
FIGS. 1A and 1B are diagrams to illustrate the data transmission process between an interrogation device and a transponder within a transponder system according to the invention.

FIG. 1A represents an interrogation signal 10 in the form of the field strength s generated by it between the points in time $t_0$ and $t_1$. After a brief delay t, which is used by the transponder to check whether sufficient energy is already stored in order to send the data, the transponder re-transmits the RF response signal 12 in the time period between $t_2$ and $t_3$, where this signal is also indicated by its field strength in FIG. 1A. This operating mode, whereby the transmission of the interrogation pulse and the re-transmission of the RF response signal follow each other in time, is generally termed half-duplex operation.

Figure 1B:
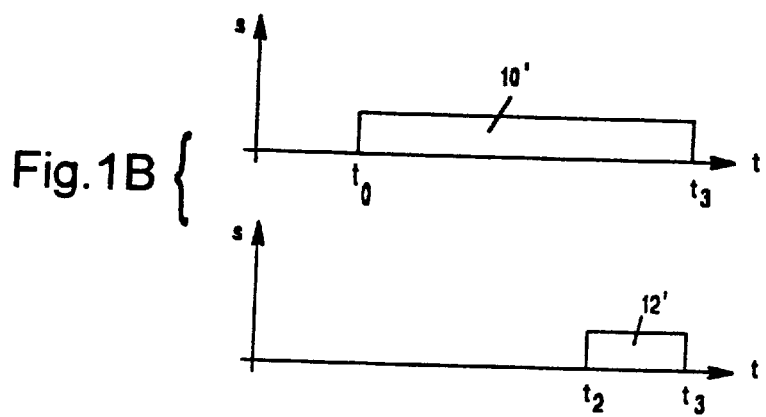

It is, however, equally possible and standard practice to continue sending the RF interrogation signal during the retransmission of the RF response signal by the transponder, so that both the RF interrogation signal and the RF response signal overlap each other in time within an area. It is obvious that the transmission of the RF interrogation pulse must start before the re-transmission of the response signal can commence, since the supply energy for the re-transmission must first be made available in the transponder. This is illustrated in FIG. 1B by means of the RF interrogation signal 10' and the RF response signal 12'. This operating mode is normally known as full-duplex operation.

Figure 2A:
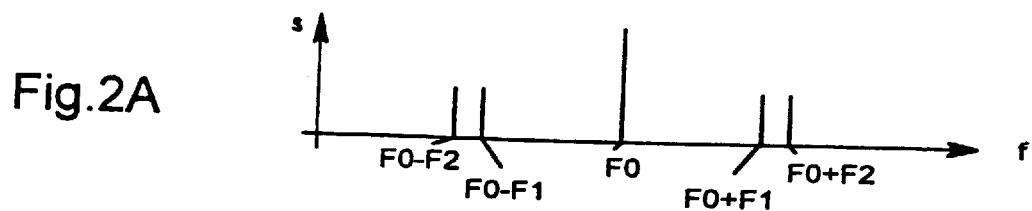
FIG. 2 shows the frequency spectra of the RF response signal (FIG. 2A), the background noise (FIG. 2B) and the RF response signal with the superimposed background noise received by the interrogation device (FIG. 2C)

Let it be assumed that frequency shift keying modulation (FSK modulation) is used for the transmission of the data in the transponder system. This means that the H bits and the L bits are expressed each by different modulation frequencies. To give an example, the modulation frequency F1 may be used for the L bit, and the modulation frequency F2 for the H bit. This means that, after modulation, apart from the carrier frequency F0, the frequencies F0−F1, F0−F2, F0+F1 and F0+F2 are also present within the spectrum of the RF response signal. This spectrum is illustrated in FIG. 2A.

Figure 2B:
Figure 2C:
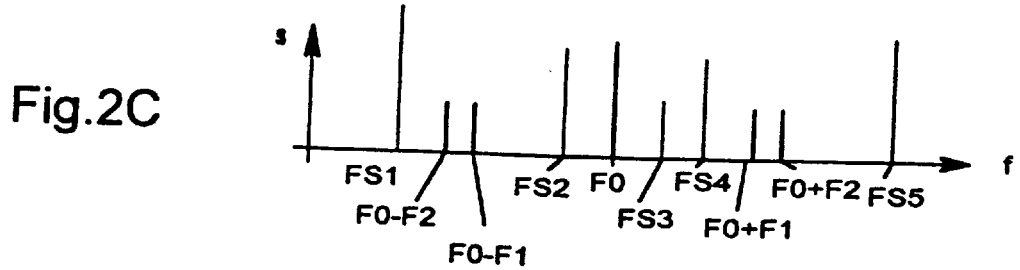

In practical applications of such a transponder system, fixed interference frequencies are usually present. These interference frequencies may originate from commercial transmitting devices or also from insufficiently screened appliances or similar. These interference frequencies may have such a high field strength at the location of the interrogation device that it becomes impossible to read the data from the transponder correctly, as soon as a certain distance between the transponder and the interrogation device is exceeded, or the signal-to-noise ratio becomes excessive. As an example, FIG. 2B illustrates a background noise spectrum in which the interference frequencies FS1, FS2, FS3, FS4 and FS5 are present. FIG. 2C represents the entire frequency spectrum which is covered when both the background noise with the interference frequencies of FIG. 2B as well as the RF response signal of FIG. 2A are present.

Figure 3:
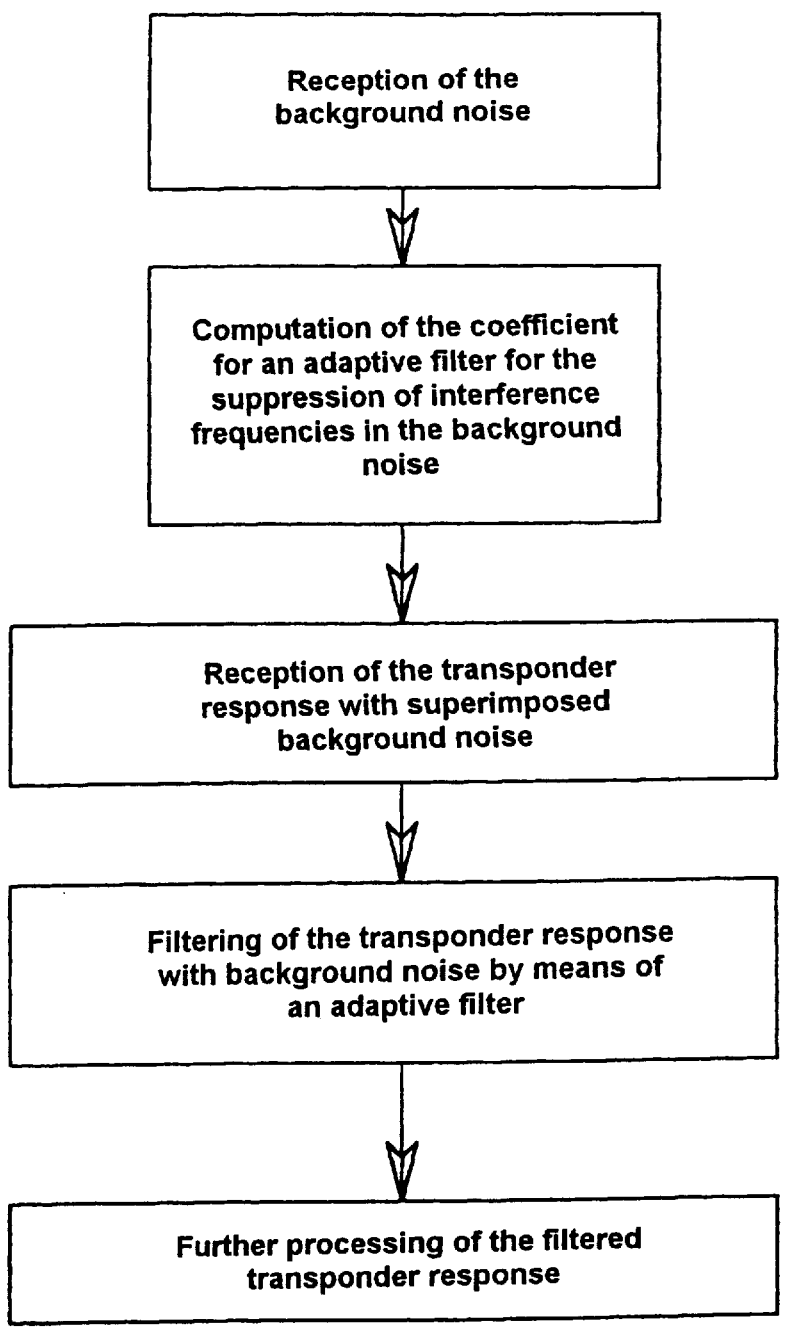
FIG. 3 is a diagram to illustrate the operational sequence of the procedure according to the invention.

With the aid of the diagram of FIG. 3 an explanation shall now be made as to how the data stored in the transponder can still be correctly read when there is a greater distance between the transponder and the interrogation device and even when interference frequencies are present.

Before beginning the read process, which is initiated, as previously explained, by the transmission of an RF interrogation pulse, the interrogation device at first receives the background noise. In this way, interference frequencies can be determined which are present within the frequency range of the data transmission between the interrogation device and the transponder. At this stage, all frequencies are labelled as interference frequencies which are received at a field strength exceeding a pre-determined threshold.

On the basis of the interference frequencies so determined, the coefficients of an adaptive digital filter can be computed, by means of which the filter can be tuned so that exactly these interference frequencies are suppressed, whilst differing frequencies are allowed to pass.

The interrogation device now transmits the RF interrogation pulse, which triggers the transmission of the data stored in the transponder. The interrogation device receives the RF response signal from the transponder, onto which is superimposed the background noise with the interference frequencies contained therein. This signal is now routed through the adaptive filter, which, with the aid of the previously computed coefficients, has been tuned so as to suppress the interference frequencies. The output of the filter therefore provides a signal which now only contains the frequency components of the RF response signal transmitted by the transponder, so that this signal may then be subjected to further processing, such as demodulation, to give an example.

Since, as has been explained, the interference frequencies in the output signal of the adaptive filter have been suppressed as far as possible, the possible range between the transponder and the interrogation device is thereby increased. Because of the absence of the interference components, the interrogation device is still capable of correctly processing the signals although they are weakened by distance.

Should it appear that an interference frequency is very close to a sideband frequency within the RF response signal transmitted by the transponder, this then signifies that even this sideband frequency is suppressed by the adaptive filter. The output of the filter therefore outputs a signal which, although no longer containing any interference frequencies, also no longer contains a sideband frequency needed for the FSK demodulation. This fact can be taken advantage of in that the demodulation procedure for the data transmitted is modified. It is known that an FSK modulated signal, when using amplitude demodulation, can still be correctly demodulated when one of the two sideband frequencies is missing in the spectrum of the signal received.

It has been indicated in the above-described procedural sequence that the background noise is received and analysed before the RF interrogation pulse is transmitted. However, it is equally feasible to invert this sequence, in other words to receive the background noise only after reception of the RF response signal transmitted by the transponder together with the superimposed background noise.

If a particularly high reading reliability is required, the reception of the background noise and its analysis with respect to the presence of interference frequencies can take place before or after each time an RF response signal is received from the transponder. This ensures that the required suppression of interference frequencies is always achieved, even when interference conditions change with different application locations. If, however, it may be assumed that the environmental conditions with respect to the presence of interference frequencies is not likely to change, it will be sufficient to receive and analyse the background noise only once, so that the adaptive filter can be permanently tuned to the interference frequencies identified in each case. This makes it possible to speed up the reading process, since there will then be no need for the reception of the background noise.

Figure 4:
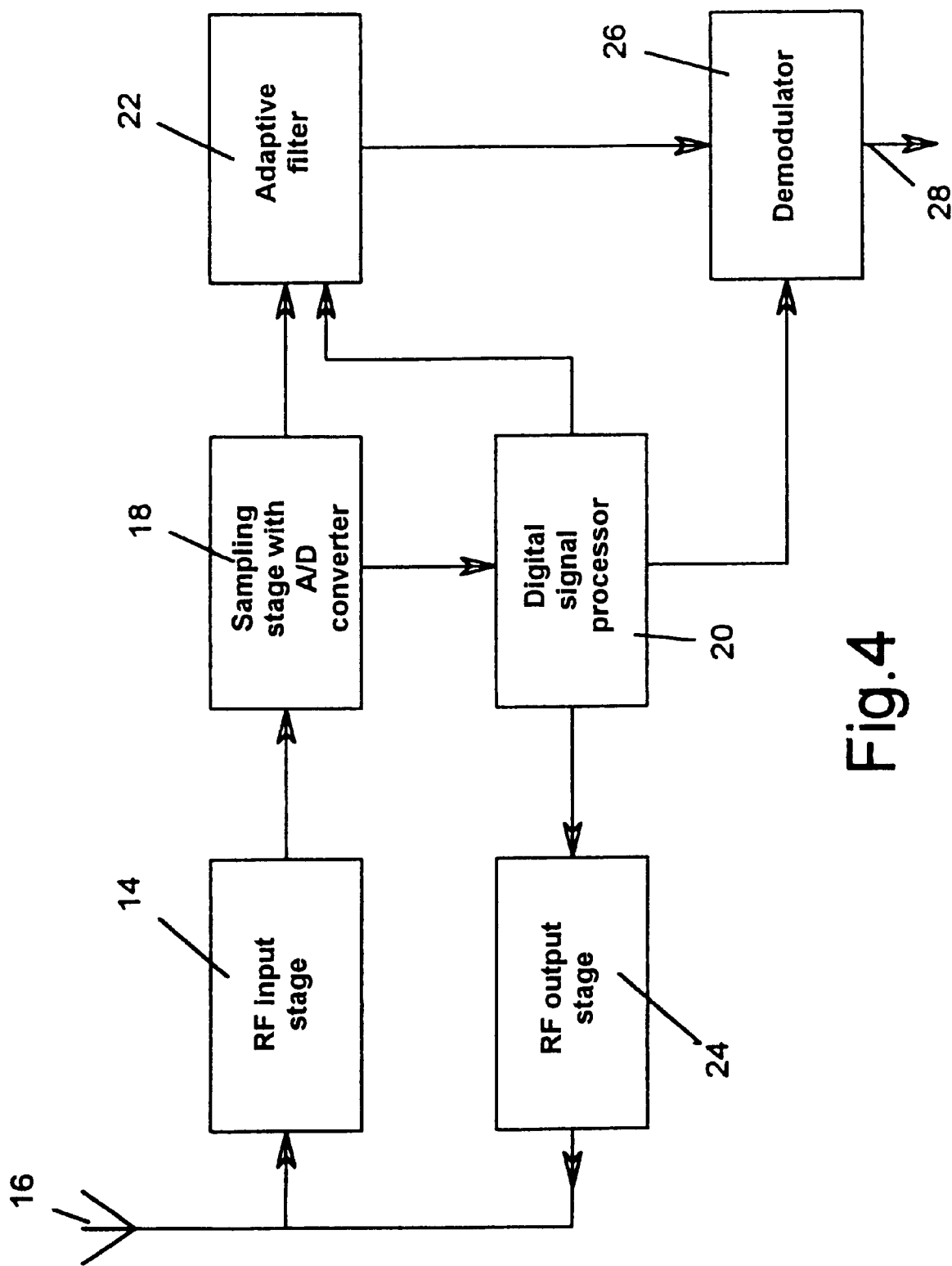
FIG. 4 is a simple block diagram of the interrogation device within the transponder system according to the invention.

FIG. 4 illustrates the fundamental structure of an interrogation device for the execution of the procedure described above, by means of a simple block diagram. The interrogation device comprises an RF input stage 14 which can both transmit and receive RF signals by means of an aerial 16. The signals output by the RF input stage 14 are converted into digital signals in the analogue-to-digital converter 18, which are then analysed by a digital signal processor 20 for the presence of interference frequencies. The digital signal processor 20 generates coefficients for an adaptive filter 22 which, by means of these coefficients, can be tuned in such a way as to suppress the interference frequencies detected. The digital signal processor 20 also controls the entire procedural sequence of the retrieval device. After analysing the background noise, it initiates the transmission of the RF interrogation pulse by the RF output stage 24 via the aerial 16, which prompts the transponder, not shown in the figure, to transmit the RF response signal. The RF response signal received from the transponder by the RF input stage 14 is also digitised by the analogue-to-digital converter 18, and routed through the adaptive filter 22, so that a signal which is freed from interference frequencies becomes available at its output. This signal is then demodulated in a demodulator 26, so that the required data become available at its output 28.

Although the adaptive filter 22 and the demodulator 26 are shown as individual blocks in FIG. 4, these units may in praxis be equally well realised as software modules, which are stored in the digital signal processor 20 and are then processed by it. The digital signal processor 20 processes the signals output by the analogue-to-digital converter 18 in such a way as to obtain the required filtering and demodulation. This type of signal processing is conventional and known to the expert, so that there is no need here to explain it in more detail. It is even possible to integrate the analogue-to-digital conversion into the digital signal processor 20, so that the entire processing of the signal received by the RF input stage 14 can be effected by the digital signal processor 20.

In practical terms, the RF signal transmitted by the transponder is a carrier at a frequency of 13.56 MHz which is modulated by the two FSK frequencies 423 kHz and 484 kHz. The frequency spectrum of this signal therefore contains, apart from the carrier frequency, the frequencies 13.56 MHz+423 kHz and 13.56 MHz+484 kHz as the upper sideband, as well as the frequencies 13.56 MHz−423 kHz and 13.56 MHz−484 kHz as the lower sideband.

What is claimed is:

1. A method of remote communication in a noisy environment, within a predetermined frequency band, between an interrogator and a transponder wherein an interrogator transmits an interrogation signal and the transponder responds with data, stored therein, modulating a transponder response signal, comprising:

receiving background noise, having frequency components, within said predetermined frequency band during a time when neither said interrogation signal nor said transponder response signal are being transmitted or received;

converting said background noise into a digital signal;

identifying said frequency components of said background noise which have an amplitude exceeding a predetermined threshold;

computing coefficients of an adaptive filter, having a passband characteristic, in dependence upon said identified frequency components such that said passband characteristic suppresses said identified frequency components;

transmitting said interrogation signal;

receiving said transponder response signal and superimposed background noise;

converting said transponder response signal and said superimposed noise into a digital signal;

routing said digital signal through said adaptive filter; and demodulating the output of said adaptive filter and yielding said data stored therein.

2. The method according to claim 1, wherein said data within said transponder response signal is FSK modulated and said transponder response signal comprises a sideband with two sideband frequencies.

3. The method according to claim 2 and further comprising:

determining whether said identified frequency components interfere with one of said two sideband frequencies; and demodulates said transponder response signal using amplitude demodulation in dependence upon said determination being positive and using FSK demodulation in dependence upon said determination being negative.

4. The method according to claim 1 wherein said reception of said background noise is performed subsequent to reception of said transponder response signal and said superimposed background noise.

5. A system of remote communication robust in a noisy environment, within a predetermined frequency band, between an interrogator and a transponder wherein an interrogator transmits an interrogation signal and the transponder responds with data, stored therein, modulating a transponder response signal, said interrogator comprising:

a receiver for receiving background noise, having frequency components, within said predetermined frequency band during a time when neither said interrogation signal nor said transponder response signal are being transmitted or received and for receiving said transponder response signal and superimposed background noise during a time when said transponder response signal is transmitted;

an A/D converter for converting said background noise and said transponder response signal and said superimposed background noise into digital signal;

a detector for identifying said frequency components of said background noise which have an amplitude exceeding a predetermined threshold;

a processor for computing coefficients of an adaptive filter, having a passband characteristic, in dependence upon said identified frequency components such that said passband characteristic suppresses said identified frequency components;

a transmitter for transmitting said interrogation signal;

an adaptive filter for filtering said digital signals;

a demodulator for demodulating the output of said adaptive filter and yielding said data stored therein.

6. The system according to claim 5 wherein the adaptive filter and demodulator are embodied as software modules which are processed by the processor for the purpose of achieving the desired function in each case.

7. The system according to claim 5 wherein said adaptive filter is integrated into the processor.

* * * * *